United States Patent [19]

Riley

[11] 4,207,434
[45] Jun. 10, 1980

[54] INTEGRAL ELECTRIC GENERATOR, MULTIPLEXER, DATA ACQUISITION SYSTEM

[75] Inventor: Leon H. Riley, Huntsville, Ala.

[73] Assignee: The United States of America as represented by the Secretary of the Army, Washington, D.C.

[21] Appl. No.: 896,849

[22] Filed: Apr. 17, 1978

[51] Int. Cl.² ............................................... H04J 3/00
[52] U.S. Cl. .................................................... 370/112
[58] Field of Search .............. 179/15 R, 15 A, 15 BL; 307/89, 127, 239, 243; 178/52

[56] References Cited

U.S. PATENT DOCUMENTS

| | | | |
|---|---|---|---|
| 2,559,606 | 7/1951 | Dubin | 179/15 A |
| 3,509,374 | 4/1970 | Lockshaw | 307/243 |
| 3,555,417 | 1/1971 | Mitchell | 307/127 |
| 3,699,325 | 10/1972 | Montgomery et al. | 179/15 BL |

OTHER PUBLICATIONS

B. Chance, et al., "Waveforms", McGraw-Hill, 1949, pp. 427, 439–441, 447–452, 454, 455.
G. Schweitzer, "Basics of Fractional Horsepower Motors", Rider, 1960, p. 8.

Primary Examiner—Malcolm A. Morrison
Assistant Examiner—E. S. Kemeny
Attorney, Agent, or Firm—Nathan Edelberg; Robert P. Gibson; Robert C. Sims

[57] ABSTRACT

An electric generator with winding and rotor design so that it powers and multiplexes several sensor inputs during rotor rotation. The rotor may be rotated by any means such as fluid (gas or liquid) or electric motors.

4 Claims, 1 Drawing Figure

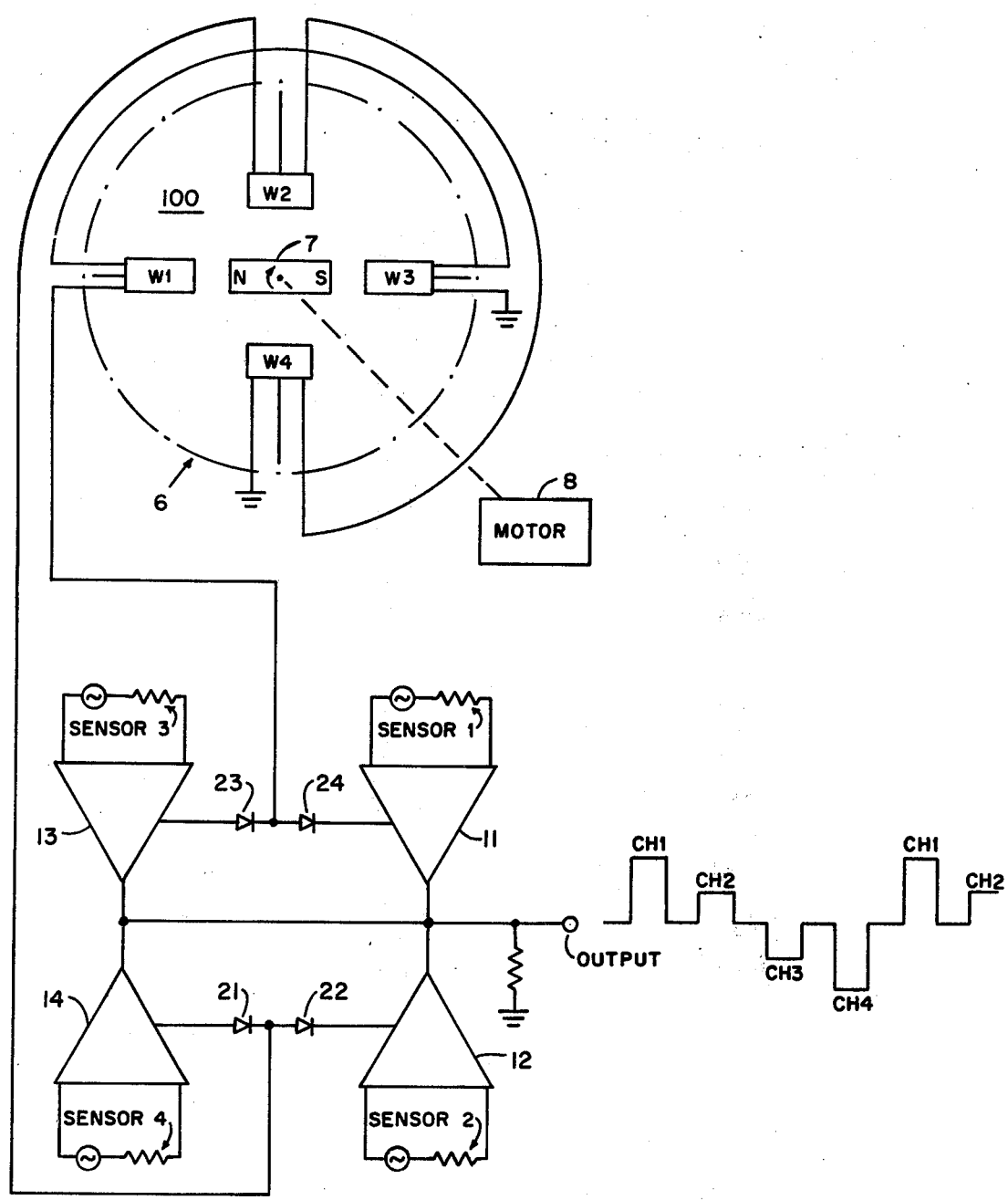

INTEGRAL ELECTRIC GENERATOR, MULTIPLEXER, DATA ACQUISITION SYSTEM

DEDICATORY CLAUSE

The invention described herein may be manufactured, used, and licensed by or for the Government for govenmental purposes without the payment to me of any royalties thereon.

BRIEF DESCRIPTION OF THE DRAWING

The single FIGURE is a schematic showing of the basic embodiment of the present invention.

DESCRIPTION OF THE PREFERRED EMBODIMENT

Present multiplexers and data acquistion systems require external electrical power or batteries. This invention eliminates the necessity of external electrical power by providing an electric generator as an integral part of the system. The system may be powered by a fluid (gas or liquid) motor or it can be driven by an electric motor. The multiplexer is an integral part of the electric generator. Each pair of stator windings command and power a separate pair of data channels.

The invention has the following advantages over previous multiplexer, data acquisition systems.

(1) The electric power source is an integral part of the system so that the multiplexer, data acquisition system may be powered by a fluid drive motor.

(2) The need for free running multivibrators and counters for multiplexer sequencing is eliminated since voltages developed in generator windings sequentially command multiplexer sample, gating, amplification and transmission.

(3) The speed of the multiplexer is not limited by switches and gears found in other mechanical multiplexers.

(4) The volume and weight required per data channel is very small compared to other multiplexers and data acquisition systems.

(5) The system is simple to build and maintain since it has one moving part to determine operation and all timing.

The operation of the integral electric generator, multiplexer, data acquisition system is described in the single FIGURE and following discussion.

The FIGURE shows four windings W1, W2, W3 and W4 on a stator housing 6 of low reluctance material. A permanent magnet rotor 7 is shown. The rotor is shown mechanically connected to a motor 8 that provides clockwise rotation. As the rotor is rotated clockwise it induces positive voltages in W1, W3, next positive voltage in W2, W4, next negative voltage in W1, W3, and next negative voltage in W2, W4. The polarity of the voltages is with respect to the ground connections. This completes one revolution, and the same cycle is repeated every revolution. Since gears or switches are not required the rotational speed of the rotor is not mechanically limited, and rotor speeds in excess of 300,000 revolutions per minute will be used. The pulses generated are directed to each gate amplifier 11-14. Diodes 21-24 separate positive and negative pulses.

The positive pulse developed in W1, W3 turns on channel gate amplifier 11 and sensor 1. This results in a pulse output proportional to the parameter sensor 1 is measuring. A calibration may be used in place of sensor 1 or any other sensor. A positive pulse from W2, W4 similarly turns on amplifier 12 and sensor 2 and results in an output proportional to the sensed input. Amplifiers 13 and 14 operate similarly and outputs proportional to inputs result. Negative voltages are then present for 13 and 14 in this mechanical construction of the rotor. This cycle is repeated for each rotor revolution.

The output waveform, as it would be viewed on an oscilloscope, is shown in the FIGURE. The width of the space between the output pulses may vary by field coil design to aid in identification. The output of this system can be conducted to recorders, displays or telemetry equipment by hard wire cables. Telemetering techniques utilizing such things as infrared light emitting diodes can be directly incorporated into this system utilizing system generated electrical power.

This four channel system is presented for explanation. The channel capacity of this is not limited to four. Two, ten and 20 channel systems appear very attractive. Physical size and practicality are the channel capacity limits.

Gate amplifiers 11-14 can take the shape of any of the well known gate amplifiers. Further a simple transistor which is powered by the outputs of generator 100 and is controlled by the sensors 1-4 could be used. Other gating means could be used in place of amplifiers 11-14 such as silicon control rectifiers having their control element connected to rectifiers 21-24 and their power input from sensors 1-4.

I claim:

1. A system comprising a generating means having a plurality of windings; a rotating means in said generating means being adapted for rotation such that voltage will be generated in said windings in a sequential manner; a plurality of gating means; a plurality of connecting means connected between said windings and gating means such that said gating means will be triggered in a sequential manner in accordance with the voltage induced in said windings; said windings are connected in pairs such that their voltages will add when presented to said connecting means; said windings are two pairs in number; said connecting means being two pairs of diodes each connected in series; said gating means consisting of first, second, third and fourth gating means each having a gate control terminal, an output terminal and an input terminal; said pairs of diodes being connected across said first and second gating means control terminals and said third and fourth gating means control terminals respectively; a common connection; and said pairs of windings being connected to a point between said pairs of diodes and said common connection.

2. A system as set forth in claim 1 further comprising a plurality of data information systems each having an output connected individually to the input terminals of said gating means; said gating means each producing an output between its output terminal and said common connection; said output terminal of each gating means being connected to a common output line; and said common output line having a voltage output which is representative of a selected one of said data systems output in accordance with the rotation of said rotating means.

3. A system as set forth in claim 2 wherein said gating means are amplifier means.

4. A system as set forth in claim 3 wherein said rotor means is a permanent magnet rotor and said winding means being mounted on a stator with each pair of windings being 180° apart relative to said stator.

* * * * *